United States Patent

Young et al.

[11] Patent Number: 6,116,780
[45] Date of Patent: Sep. 12, 2000

[54] DISPOSABLE TOILET SYSTEM

[75] Inventors: Daniel L. Young, Escondido; Joseph A. Bradley, III, San Diego, both of Calif.

[73] Assignee: American Innotek, Inc., Escondido, Calif.

[21] Appl. No.: 09/234,401

[22] Filed: Jan. 20, 1999

[51] Int. Cl.⁷ .................................................. B65D 30/24

[52] U.S. Cl. ............................... 383/44; 383/33; 383/36; 383/63; 383/75; 4/144.2

[58] Field of Search .................................... 600/573, 580; 604/332, 327; 383/36, 44, 33, 63, 75, 61, 89; 4/144.1, 144.2

[56] References Cited

U.S. PATENT DOCUMENTS

| | | |
|---|---|---|
| 2,866,980 | 1/1959 | Huntington . |
| 3,005,994 | 10/1961 | Heil . |
| 3,164,186 | 1/1965 | Weber et al. .......................... 383/36 X |
| 3,403,410 | 10/1968 | Benzel et al. ........................ 4/144.2 X |
| 3,452,368 | 7/1969 | Couper . |
| 3,484,875 | 12/1969 | Eisenberg . |
| 3,643,266 | 2/1972 | Black . |
| 3,724,461 | 4/1973 | Eisenberg .............................. 383/44 X |
| 4,387,713 | 6/1983 | Calanni .................................... 604/333 |
| 4,990,145 | 2/1991 | Fleury ...................................... 604/317 |
| 5,007,116 | 4/1991 | Yamamoto . |
| 5,010,599 | 4/1991 | Nilsson . |
| 5,040,249 | 8/1991 | Diaz . |
| 5,065,459 | 11/1991 | Tjahaja et al. . |
| 5,170,516 | 12/1992 | Davison . |
| 5,275,584 | 1/1994 | Hogan . |
| 5,354,132 | 10/1994 | Young et al. .......................... 383/46 X |
| 5,356,398 | 10/1994 | Willis .................................... 383/63 X |
| 5,368,583 | 11/1994 | Fleury ...................................... 604/318 |
| 5,569,225 | 10/1996 | Fleury ...................................... 604/323 |
| 5,745,926 | 5/1998 | Cailleteau ............................. 383/44 X |
| 5,946,738 | 9/1999 | Cailleteau ................................. 4/144.1 |

FOREIGN PATENT DOCUMENTS 0162247  7/1991  Japan ....................................... 383/63

OTHER PUBLICATIONS

Uncle Booger's Bumper Dumper, http://members.aol.com/bumperdmpr/bumper.htm, Jan. 26, 1999.
General Services Administration Net Price List, brochure, by American Innotek, Inc. No Date.
Brief Relief Field Lavatories brochure, by American Innotek, Inc. No Date.
Brief Relief Commode The System That Goes Whereover You Go, brochure, by American Innotek, Inc. No Date.

*Primary Examiner*—Jes F. Pascua
*Attorney, Agent, or Firm*—Brown, Martin, Haller & McClain, LLP

[57] ABSTRACT

A disposable toilet receptacle includes a bag and a funnel made of a sheet-like liquid-impermeable material, such as plastic film. The plastic film of which the bag is made may be a vapor barrier film. The top edge of the bag has a closure. The tapering body of the funnel is connected to the interior of the bag along a line extending between the side edges of the bag that defines a boundary between an upper chamber and a lower chamber. The portion of the funnel having the wide opening or inlet is disposed in the upper chamber, and the portion of the funnel having the narrower opening or outlet is disposed in the lower chamber. The lower chamber may have in it a gellable hydrophilic material that absorbs liquid waste. The portion of the funnel disposed in the upper chamber is, when fully extended, longer than the upper chamber. The outlet end of the funnel may be a flutter valve that prevents backflow of waste. To use the bag, a user opens the closure and extends the funnel. The user can then support the bag in preparation for use as a toilet by draping the inlet end of the funnel over the rim of such a bucket or other support structure. After use, the funnel can be stuffed into the upper chamber. The user can then close the closure, sealing the soiled funnel inside the upper chamber.

16 Claims, 3 Drawing Sheets

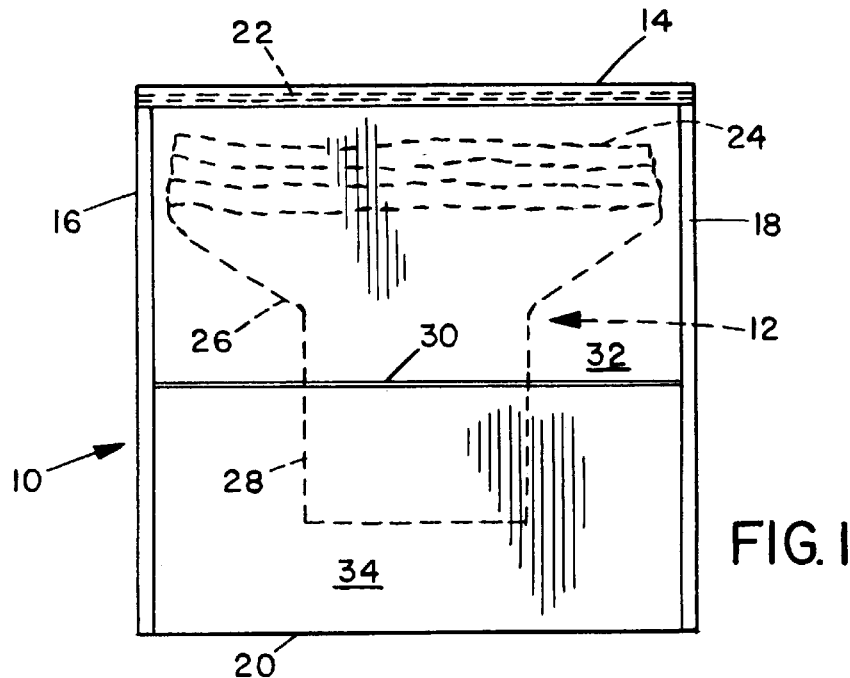
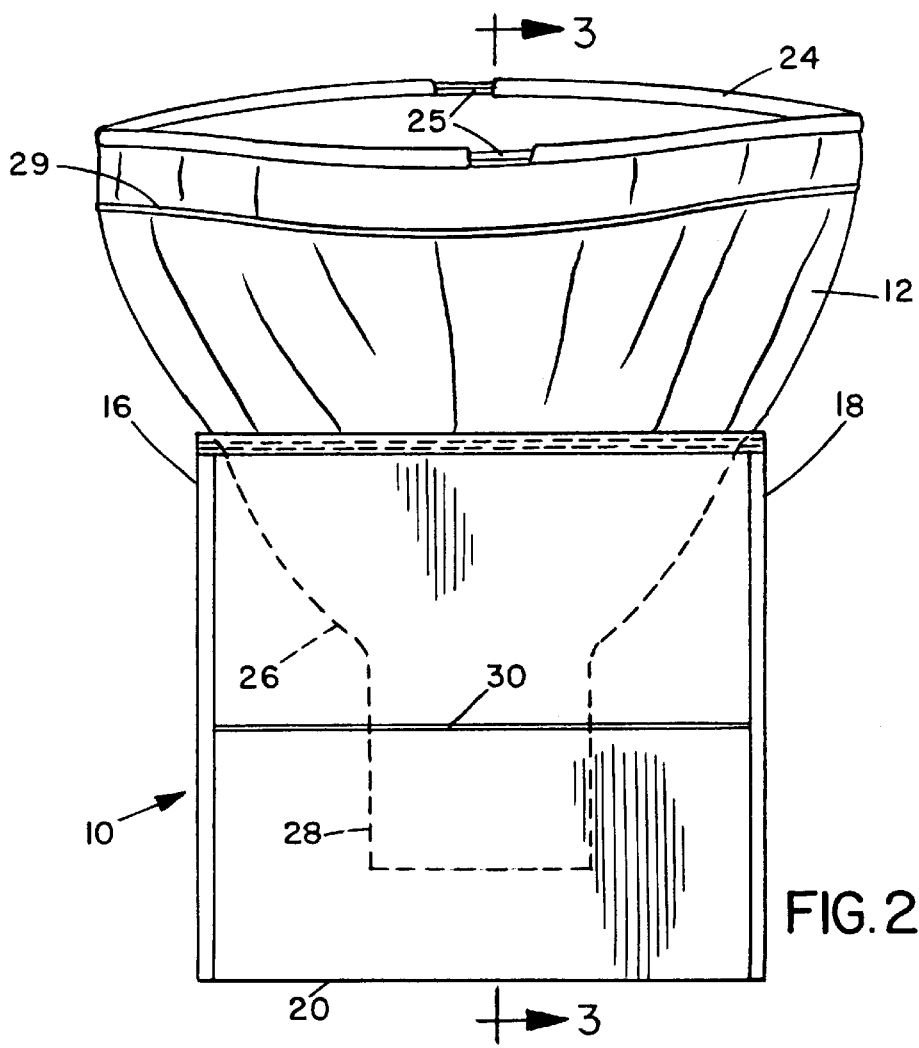

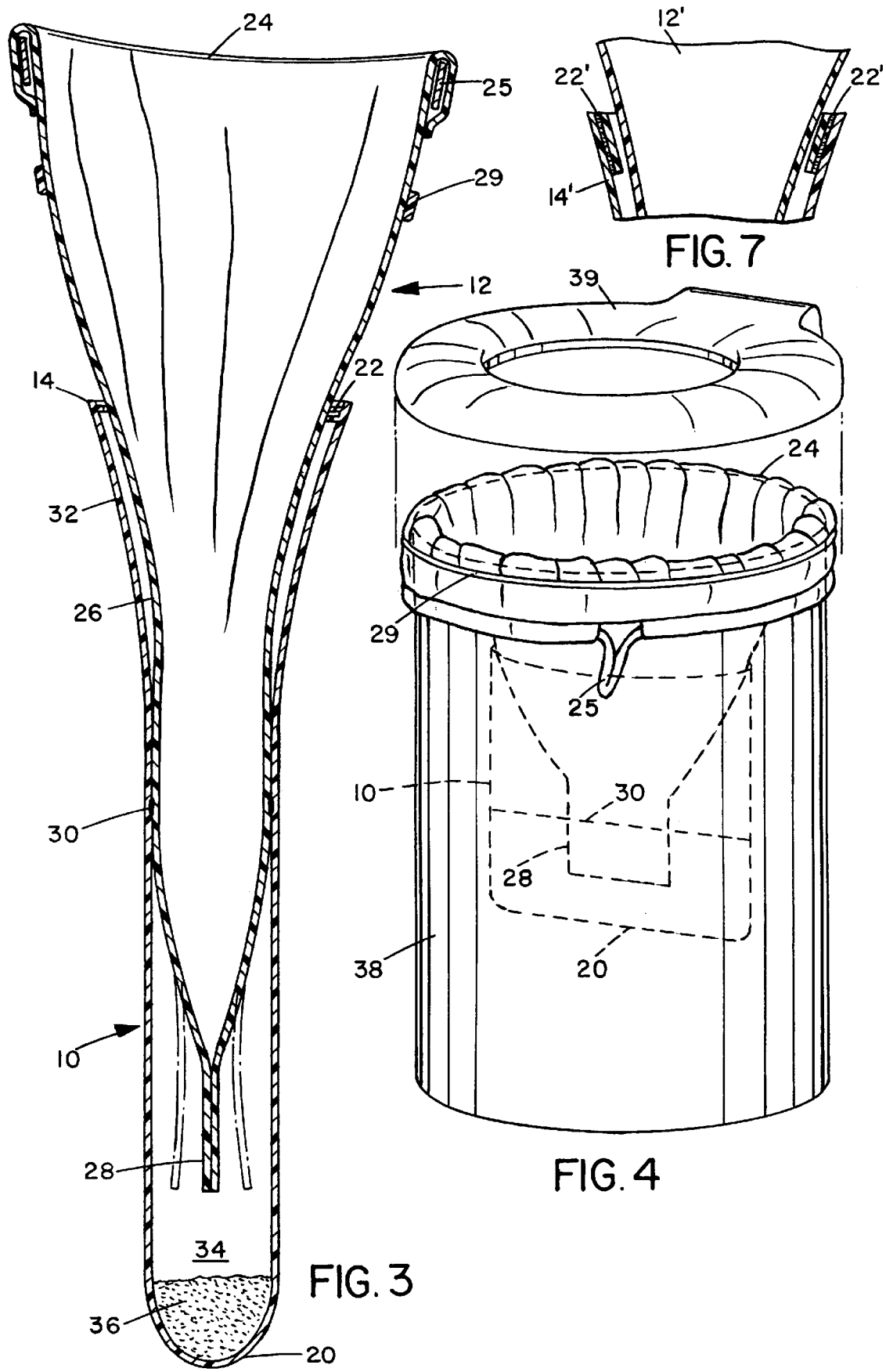

1

DISPOSABLE TOILET SYSTEM

BACKGROUND OF THE INVENTION

1. Field of the Invention

The present invention relates generally to toilet systems for use by persons when no permanent toilet facilities are available and, more specifically, to such systems that include a bag-like receptacle.

2. Description of the Related Art

Portable toilets may be used in locations where no permanent toilet facilities are available, such as at outdoor construction or work sites, campsites, or outdoor events. A typical portable toilet comprises a generally conventional toilet seat mounted above a tank or similar receptacle and may be enclosed for privacy. Most portable toilets are large, bulky and heavy and therefore inconvenient and costly to transport and store. They are also expensive to purchase, limited in their disposal options, costly and inconvenient to clean and are subject to residual accumulation of noxious odors and dangerous germs. A need exists for portable toilets that are more economical, are more readily transported and stored, do not require cleaning and do not lead to the accumulation of noxious odors and dangerous germs.

In partial response to this need, disposable toilets that include a bag-like receptacle, a foldable receptacle, or similarly compact receptacle have been developed. The common concept underlying these toilets is that the receptacle functions as a liner for collecting waste inside a rigid or collapsible supporting structure. Following use, the receptacle can be removed from the structure for disposal. The receptacle may have a closure to seal the waste inside it before disposal. Such disposable bag-like receptacles suffer from a number of problems. For example, because most of these receptacles consist of little more than standard light weight garbage bags with or without drawstring closures, the bags themselves are highly susceptible to breakage or tearing and the resulting unintended discharge of their noxious contents. Even if the bags are not torn or broken they are highly susceptible to leakage either through the insecure drawstring or other seepage. Such potential for leakage or rupture makes these bags inappropriate for disposal in normal trash receptacles after use. In addition, even under the most favorable of circumstances the migration of odors from such bags makes their storage, even for short periods of time, highly problematic at best. It is also highly likely for a user's hands to become soiled from waste that rubs off from the neck of the receptacle. The use of such toilets is thus largely limited to situations in which the user is able to quickly dispose of the receptacle after use and does not need to transport it to a disposal site.

Fluid containment bags that can be used by pilots, workers in the field and others who have no immediate access to fixed urinal facilities are known. These bags are not designed for admission of fecal waste. One such urinal bag is the BRIEF RELIEF™ bag sold by American Innotek, Inc. of Escondido, Calif. and described in, for example, U.S. Pat. No. 5,116,139. It has a flattened, rectangular shape with a funnel in the top edge for receiving urine. No specific provision is made in such bags for the added odor control requirement created by the collection of fecal waste nor is subsequent bag security as significant of a concern. The narrow end of the funnel extends into the bag and terminates at a flutter valve. The BRIEF RELIEF™ bag also includes a super absorbent hydrophilic polymer that forms a gel upon contact with urine, which combined with the one way valve and closure, forms a secure means of sequestering liquids.

The above-referenced patent also notes that polymer granules may be mixed with fragrances to mask odors, enzymes to break down the urine, or biocides to minimize growth of bacteria and other microorganisms.

It would be desirable to provide an economical disposable toilet system for receipt of liquid and solid waste that includes a receptacle that can be stored compactly and that a user can securely seal and readily transport to a disposal location after use without soiling his hands or experiencing the unpleasant and unsanitary effects of fluid, vapor or odor leakage. These problems and deficiencies are clearly felt in the art and are solved by the present invention in the manner described below.

SUMMARY OF THE INVENTION

The present invention includes a receptacle for collecting harmful and offensive waste and a method for using it. The receptacle includes a liquid and odor impermeable bag and a funnel made of a sheet-like liquid-impermeable material, such as plastic film. The funnel may have any suitable range of tapering dimensions. The bag may have any suitable shape and may be constructed in any suitable manner of one or more pieces of material. Although the bag is described with respect to top edge, side edges and a bottom edge, the term "edges" is used broadly in this patent specification for purposes of reference and convenience, and these edges may have any suitable shapes and contours. The top edge of the bag has a closure for sealing the bag. The bag has an upper chamber and a lower chamber. The funnel thus defines a conduit between the chambers. The upper chamber can also be used to transport and store ancillary supplies such as toilet paper, antiseptic wipes or rubber gloves.

In an exemplary embodiment of the invention, the tapering body of the funnel is connected to the interior of the bag along a line extending between the side edges of the bag. The connection that defines this line may be a heat or pressure seal, an adhesive or other suitable connection. Preferably, however, a heat seal between opposing surfaces of the bag and between the bag and the funnel defines this line. The line thus defines a boundary between an upper chamber and a lower chamber in the bag. The portion of the funnel having the wider opening or inlet is thus disposed in the upper chamber, and the portion of the funnel having the narrower opening or outlet is disposed in the lower chamber.

The lower chamber may have in it a sorbent hydrophilic material that sequesters liquid or semi-solid waste, and may include any suitable enzymes, beneficial microorganisms, biocides, fragrances, deodorants, etc.

In the exemplary embodiment, the portion of the funnel disposed in the upper chamber is, when fully extended, longer than the upper chamber. In other words, the distance between the line and the inlet end of the funnel is greater than the distance between the line and the top edge of the bag. These proportions allow the funnel to be extended out of the upper chamber for use and to be stored inside the upper chamber before use and after use. The outlet end of the funnel may be a flutter valve that prevents backflow of waste.

Accordingly, to use the bag, a user opens the closure to gain access to the upper portion of the bag. The user can then use the receptacle as a toilet in any suitable manner. In an exemplary embodiment, a user can support the bag in a suitable support structure, such as a common five-gallon plastic bucket or an office sized waste basket. The user can drape the inlet end of the funnel over the rim of such bucket or other support structure (which may include a collapsible framework and may include a removable toilet seat) so as to form a bowl-like receptacle. In the exemplary embodiment, the inlet end of the funnel has a draw tape type closure which the user can use to secure the funnel to the rim of the support structure. After the receptacle has received waste, the user can pull the draw tape to close the opening of the funnel, remove the receptacle from the support structure, if any, fold up the upper portion of the funnel into the upper chamber and reseal the closure on the receptacle bag.

The foregoing, together with other features and advantages of the present invention, will become more apparent when referring to the following specifications, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 illustrates a disposable waste receptacle, with the funnel in the stored position;

FIG. 2 is a similar view, with the funnel in an extended and opened position in preparation for use;

FIG. 3 is an enlarged sectional view taken on line 3—3 of FIG. 2, showing sorbent material in the lower chamber of the receptacle;

FIG. 4 illustrates the disposable waste system in its operational configuration, including a support structure and removable toilet seat.

FIG. 7 illustrates an alternative bag closure.

DESCRIPTION OF A PREFERRED EMBODIMENT

Figure 5:
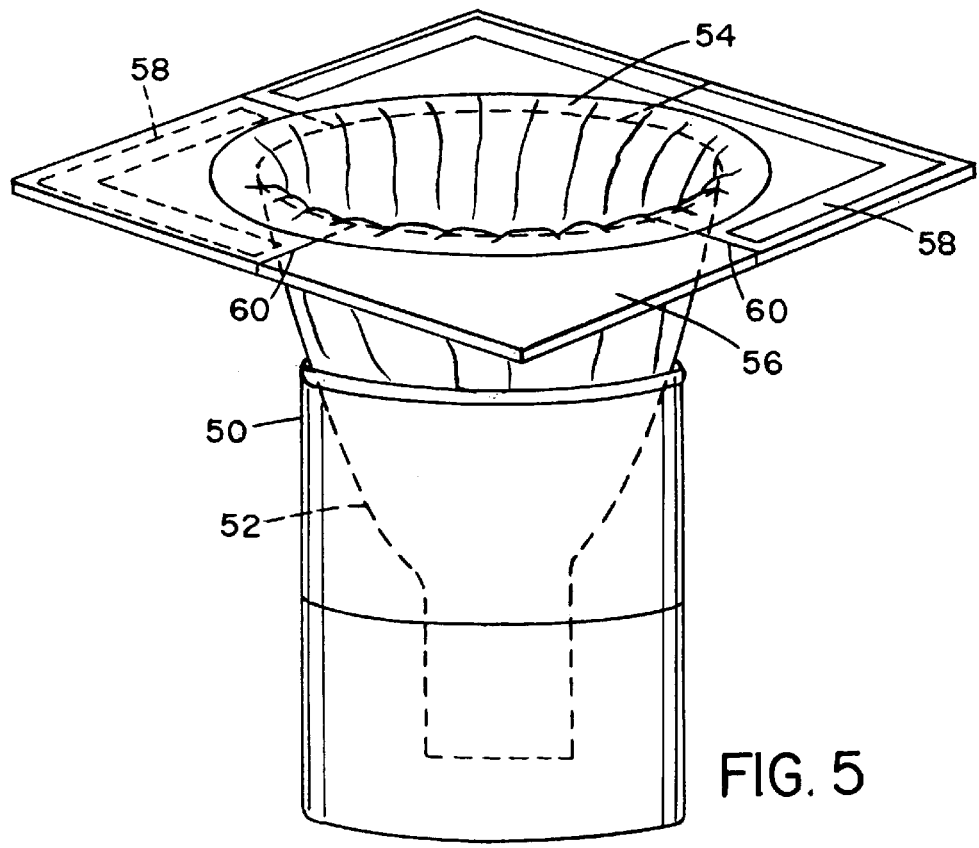
FIG. 5 illustrates an alternative disposable waste receptacle having an integral support framework.

As illustrated in FIG. 1, a disposable waste system includes a bag 10 made of a sheet-like liquid and odor-impermeable material such as metallized vapor barrier film, and a funnel 12, made of lighter weight plastic film. Bag 10 has a top edge 14, side edges 16 and 18, and a bottom edge 20. The plastic film is preferably impermeable to odors as well as fluids. A suitable liquid and odor impermeable material is known as a metallized vapor barrier film, such as a SHANNON SHIELD 115/3, manufactured by Shannon Packaging Company of Chino, Calif., which is a 3.5 mil thick multi-layer film comprising a vapor-deposited aluminum barrier layer between polyester and black polyolefin film layers. Although some types of plastic film inhibit penetration by vapors to a greater extent than others, it should be noted that the term "vapor barrier film" is a term of art that refers to a certain category of materials, and the preferred embodiment is impermeable to vapors, odors (gases), moisture and light.

Bag 10 may be made in any suitable manner from any suitable number of pieces. Preferably, it is made by heat-sealing together the adjacent edges of two parallel sheets of the odor impermeable material, each bounded by edges 14, 16, 18 and 20, or by folding a single sheet of material and heat-sealing along 10 a subset of those edges. Top edge 14 has a closure 22, which may be integrally formed in bag 10 or be a separate part attached by, for example, heat-sealing it to the remainder of bag 10 along top edge 14. Closure 22 may be a ZIPLOC®-type flexible snap zipper having opposing sides with a rib formed in one side that snaps into the channel between two parallel ribs formed in the other side. In an alternative embodiment, as illustrated in FIG. 7, the closure at top edge 14' of an alternative but otherwise identical bag 10' may include opposing pressuresensitive adhesive strips 22' having peelable protective backings.

Funnel 12 has a wide inlet end 24, a body 26 that tapers from inlet end 24 to a narrower flutter valve 28 at an outlet end. Between inlet end 24 and flutter valve 28 is a foldable and/or compressible stiffener 29, such as plastic tubing adhesively attached to funnel 12. (See FIG. 2.) Inlet end 24 has a draw tape 25 enclosed within an annular channel preferably formed by heat-sealing a cuff in the plastic sheet material. As described further below, funnel 12 may be made of any suitable number of pieces, including integrally forming it with bag 10 or a portion thereof as a unitary structure. Preferably, however, funnel 12 is a separate structure with its exterior sides attached to the interior opposing surfaces of bag 10 by heat-sealing along a line 30 extending between side edges 16 and 18. The heat-sealing also seals interior opposing surfaces of bag 10 to one another at each point along line 30 at which funnel 12 is not interposed between those surfaces. In the illustrated embodiment, such points exist near edges 16 and 18 at line 30. Nevertheless, in other embodiments, funnel 12 may extend this entire width. Funnel 12 is preferably a separate structure joined or attached to bag 10 because in part it would be less economical to make funnel 12 from the same vapor barrier material of which bag 10 is preferably formed when ordinary (non-vapor barrier) plastic film is adequate, and in part because the vapor barrier material being thicker and stiffer than ordinary plastic film, would be more difficult to fold and would be less efficient as a flutter valve. Although in the illustrated embodiment line 30 is straight, is located at approximately the midpoints of edges 16 and 18, and is defined by a heat-seal, in other embodiments the connection line may have another shape, may be located differently, or may be defined by other means of connection between bag 10 and funnel 12, such as an adhesive line or a line which is integrally formed where parts join one another. In other words, in an embodiment in which one or more portions of bag 10 and funnel 12 that are shown in the illustrated embodiment as separate parts attached by heat-seal lines are instead integrally formed together as a unitary structure, e.g., by a plastic molding process, the connection line may reflect the boundary between the integrally formed portions rather than any discontinuity in the plastic material. Persons skilled in the art will readily appreciate various other ways of making the above-described dual-chamber receptacle structure in view of the teachings in this patent specification.

Line 30 defines a boundary between an upper chamber 32 and a lower chamber 34 in the interior of bag 10. When the receptacle is in a stored state illustrated in FIG. 1, e.g., before or after use as a toilet, the portion of funnel 12 that includes inlet end 24 is gathered or folded up inside upper chamber 32. Note that stiffener 29 is folded up along with that portion of funnel 12. Another portion of funnel 12 that includes flutter valve 28 is disposed in lower chamber 34. Funnel 12 thus defines a conduit across line 30 between upper chamber 32 and lower chamber 34. In its extended position the portion of funnel 12 which is to be disposed in upper chamber 32 in its folded position, extends substantially above the top of upper chamber 32. In other words, the distance between line 30 and inlet end 24 of funnel 12 is greater than the distance between line 30 and top edge 14 of bag 10. These proportions allow the upper portion of funnel 12 to be extended out of upper chamber 32 during use, as illustrated in FIGS. 2–4. They also allow the storage and transport of ancillary items (not shown) including antiseptic wipes and toilet paper.

As illustrated in FIG. 3, lower chamber 34 may have in it a gellable material 36 for transforming the fluid entering the bag into a gelatinous or semisolid state. Gellable material 36 contains a hydrophilic polymer that rapidly gels water based liquids upon contact. Such polymers are commercially available and are commonly included in a variety of products, including disposable diapers and cleaning compositions. Typical examples include the acrylonitrile-based polymers described in Elias, *Mega Molecules*, pp. 157–158 (1987) and the acrylic polymers described in U.S. Pat. No. 4,179,367 (Barthell et al.). Gellable material 36 is preferably a complex mixture including not only the gellable polymer but also materials such as protease, cellulase, lypase and amylase enzymes to attack and break down the fecal and similar solid waste as well as any toilet paper so as to enhance the operation of the gellable polymer and beneficial microbes. Deodorants, fragrances, biocides, antivirals and other substances may also be included in gellable material 36. Gellable material 36 may be in any convenient physical form that can be placed into a bag. Granular, powdered, foamed, matted, woven and fibrous forms are all suitable. A suitable granular form of hydrophillic polymer is commercially available under the trade name CHEMDAL MEDIGEL 100, from Chemdal Corporation located at 1530 E. Dundee Rd., Suite 350, Palatine, Ill. 80087. The manufacturer describes this product as a cross linked acrylic polymer super absorbent but its formulation is proprietary, and the exact identification of the components and formula is not available to the inventors of the present invention. A suitable enzyme mixture, comprising cellulase, lypase and amylase enzymes, is commercially available under the trade name CELLU-BAC 50 from American Laboratories, Inc. located at 4410 S. $102^{nd}$ St., Omaha, Nebr. 68127. Such enzymes can alternatively be used separately or in other combinations. For example, a suitable protease enzyme is availabe from American Laboratories under the trade name K-ZYME AP GRANULAR. Although in the illustrated embodiment of the invention the active material is an absorbent gellable polymer, in alternative embodiments other suitable sorbent materials may be used, including adsorbent materials.

To use the toilet system, a user opens closure 22 to gain access to upper chamber 32 and the upper portion of funnel 12, removes any supplied materials such as toilet paper and antiseptic wipes stored therein (not shown), and then the user can unfold and extend funnel 12 out of upper chamber 32. As illustrated in FIG. 4, the user can support the receptacle in a common five-gallon plastic bucket 38 or similar support structure such as an office waste basket. The user can drape inlet end 24 of funnel 12 over the rim of bucket 38 and can tie draw tape 25 to secure it to bucket 38. The toilet system is then ready for use. A suitable toilet-type seat 39 may be placed on the rim for convenience and comfort as shown in FIG. 4. The bag 12 may be draped over the toilet seat for sanitary purposes.

Waste entering through inlet end 24 is funneled through flutter valve 28 and trapped in lower chamber 34. Flutter valve 28 prevents backflow of waste out of lower chamber 34. Flutter valve 28 is a tube of flexible plastic sheet material that assumes a flattened or ribbon-like shape when in the closed position. When waste enters flutter valve 28, the opposing walls spread open to admit the waste as depicted in FIG. 3. When the waste has exited flutter valve 28, capillary action and the force of the deposited waste against the outside of flutter valve 28 closes said valve. In the closed position, the opposing walls of flutter valve 28 are in contact with each other, thereby decreasing the tendency of waste to flow back into funnel 12.

The urine or water-based waste gels rapidly upon contact with the gellable material 36. The microbial blend enzyme in gellable material 36 immediately begins to break down the waste.

After use, the user can close the funnel 12 by pulling the draw tape 25, removing the receptacle from bucket 38 and gathering or folding up the upper portion of funnel 12. The user then stuffs the gathered upper portion of funnel 12 into upper chamber 32, and reseals closure 22. In this state, the receptacle and its contained waste may be disposed of in a suitable manner.

Figure 6:
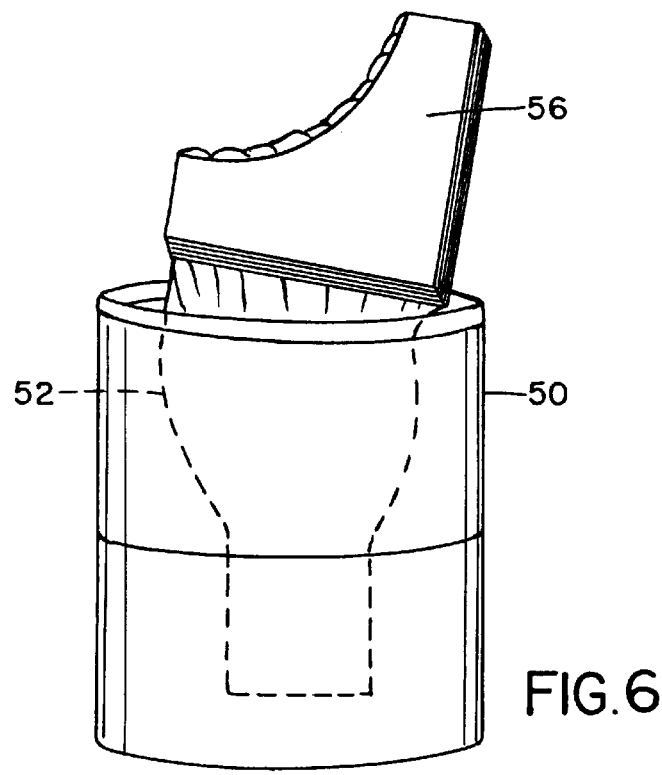
FIG. 6 illustrates the receptacle of FIG. 5 with the support framework in a folded position.

As illustrated in FIGS. 5 and 6, in an alternative embodiment, the receptacle includes a bag 50 and funnel 52. Bag 50 is identical to bag 10 described above and is integrated with funnel 52 in the same manner as bag 10 is integrated with funnel 12. The inlet end 54 of funnel 52 does not have a draw tape. Rather, it extends through a circular opening in a board 56 and is adhesively attached to the upper surface of board 56 around the periphery of the opening. Board 56 is made of a suitably stiff, lightweight material such as cardboard or FOAMCORE. Board 56 also has adhesive strips 58 of pressure-sensitive adhesive covered with peelable protective backing strips. Board 56 also has hinge lines 60 scored into it or formed in another suitable manner. Board 56 remains folded along lines 60 prior to use. (See FIG. 6.) This embodiment of the receptacle can be used in essentially the same manner as the embodiment described above with respect to FIGS. 1–4. In other words, inlet end 54 can be extended out of bag 50 and, after unfolding board 56, draped over a bucket or other suitable support. After waste is collected, the user removes the backing strips to expose adhesive strips 58 and re-folds board 56, folding it first in half, and then in half again, as illustrated in FIG. 6. Adhesive strips 58 adhere the folded opposing surfaces of board 56 to one another, facilitating reinsertion of board 56 into bag 50 and helping to seal in noxious odors. As in the above-described embodiment, in this final state the receptacle and its contained waste may be disposed of in a suitable manner.

It will be evident that there are numerous embodiments of the present invention which, not specifically described above, are clearly within the scope and spirit of the invention. Consequently, the above description is considered to be exemplary only and the full scope of the invention is to be determined solely by the appended claims.

What is claimed is:

1. A receptacle for harmful or offensive waste, comprising:

a bag made of a sheet-like liquid-impermeable material and having a top edge, two side edges and a bottom edge defining a hollow interior, a closure on said top edge of said bag for sealing said bag;

a funnel made of a sheet-like liquid-impermeable material and having a large opening at an inlet end, a small opening at an outlet end, and a tapering body between said inlet and outlet ends, said body being connected to said interior of said bag along a line extending between said side edges of said bag, said line defining a lower chamber in said bag bounded by said line, said bottom edge, and said side edges, said line also defining an upper chamber in said bag bounded by said line, said top edge, and said edges; and a distance between said line and said inlet end of said funnel being greater than a distance from said line to said top edge of said bag, whereby said inlet end of said funnel is extendible out of said upper chamber of said bag in an extended state and is storable inside said upper chamber of said bag in a folded state.

2. The receptacle claimed in claim 1, wherein a heat-seal between opposing surfaces of said sheet-like material of said bag and said sheet-like material of said funnel defines said line joining opposing inner surfaces of said receptacle up to a point at which said funnel intervenes between said surfaces, and said heat seal line continues along inner surfaces of said receptacle and outer surfaces of said funnel where said funnel intervenes.

3. The receptacle claimed in claim 1, wherein said outlet end of said funnel comprises a flutter valve.

4. The receptacle claimed in claim 1 further comprising a sorbent material in said lower chamber.

5. The receptacle claimed in claim 4, wherein said sorbent material is an absorbent.

6. The receptacle claimed in claim 5, wherein said absorbent comprises a gellable hydrophilic material.

7. The receptacle claimed in claim 1, wherein said closure of said bag comprises a flexible snap zipper.

8. The receptacle claimed in claim 1 wherein said closure of said bag comprises an adhesive line with a protective removable backing strip.

9. The receptacle claimed in claim 1, wherein said inlet end of said funnel has a closure.

10. The receptacle claimed in claim 9, wherein said closure of said funnel comprises a draw tape.

11. The receptacle claimed in claim 9, wherein said closure of said funnel comprises a foldable, generally planar support having a hole with a perimeter, and said inlet end of said conduit is attached to said support about said perimeter.

12. The receptacle claimed in claim 1, wherein said sheet-like liquid-impermeable material of said bag comprises an odor barrier plastic film.

13. The receptacle claimed in claim 12, wherein said sheet-like material is light impervious.

14. The receptacle claimed in claim 12, wherein said sheet-like material is gas impervious.

15. The receptacle claimed in claim 1, further comprising a stiffener disposed around said funnel.

16. The receptacle claimed in claim 15, wherein said stiffener comprises plastic tubing.

* * * * *